(12) United States Patent
Parisi

(10) Patent No.: US 10,384,130 B2
(45) Date of Patent: *Aug. 20, 2019

(54) FANTASY SPORT PLATFORM WITH AUGMENTED REALITY PLAYER ACQUISITION

(71) Applicant: AR Sports LLC, Glen Head, NY (US)

(72) Inventor: Leonard J Parisi, Glen Head, NY (US)

(73) Assignee: AR Sports LLC, Glen Head, NY (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/381,534

(22) Filed: Dec. 16, 2016

(65) Prior Publication Data
US 2018/0036641 A1     Feb. 8, 2018

Related U.S. Application Data

(60) Provisional application No. 62/371,318, filed on Aug. 5, 2016.

(51) Int. Cl.
| | | |
|---|---|---|
| *A63F 9/24* | (2006.01) | |
| *A63F 13/00* | (2014.01) | |
| *G06F 17/00* | (2019.01) | |
| *G06F 19/00* | (2018.01) | |
| *A63F 13/655* | (2014.01) | |
| *G06T 19/00* | (2011.01) | |
| *A63F 13/35* | (2014.01) | |
| *A63F 13/537* | (2014.01) | |
| *A63F 13/213* | (2014.01) | |

(Continued)

(52) U.S. Cl.
CPC .......... *A63F 13/655* (2014.09); *A63F 13/213* (2014.09); *A63F 13/35* (2014.09); *A63F 13/537* (2014.09); *A63F 13/828* (2014.09); *G06F 16/248* (2019.01); *G06T 19/006* (2013.01)

(58) Field of Classification Search
CPC ..... A63F 13/216; A63F 13/217; A63F 13/828
See application file for complete search history.

(56) References Cited

U.S. PATENT DOCUMENTS

| | | | |
|---|---|---|---|
| 7,699,707 B2* | 4/2010 | Bahou | A63F 13/12 463/1 |
| 7,780,532 B2* | 8/2010 | Van Luchene | A63F 13/792 463/25 |

(Continued)

FOREIGN PATENT DOCUMENTS

WO     WO2015148789 A1    10/2015

*Primary Examiner* — Milap Shah
*Assistant Examiner* — Jason Pinheiro
(74) *Attorney, Agent, or Firm* — Forge IP, PLLC

(57) ABSTRACT

The present technology provides a system and method for assembling a fantasy sports team using augmented reality. The technology employs a fantasy game server in communication with one or more users' electronic devices. The technology uses environmental data provided by the imaging device of the users' electronic devices to generate a real-world depth map, generates a virtual depth map depicting digital images of sports players and/or promotion and other tokens, and blends the virtual depth map with the real-world depth map to generate an augmented reality depth map. The users of the system access the augmented reality depth map through the user interface on their electronic devices to capture the sports players they wish to add to their fantasy sports teams.

20 Claims, 15 Drawing Sheets

(51) Int. Cl.
*A63F 13/828* (2014.01)
*G06F 16/248* (2019.01)

(56) References Cited

U.S. PATENT DOCUMENTS

| | | | |
|---|---|---|---|
| 8,315,722 B1* | 11/2012 | Russo | A63F 13/335 |
| | | | 463/4 |
| 8,633,970 B1 | 1/2014 | Mercay et al. | |
| 8,839,121 B2 | 9/2014 | Bertolami et al. | |
| 8,963,999 B1 | 2/2015 | Mercay et al. | |
| 8,968,099 B1 | 3/2015 | Hanke et al. | |
| 9,128,789 B1 | 9/2015 | Zorzella et al. | |
| 9,132,342 B2 | 9/2015 | Balachandreswaran et al. | |
| 9,522,332 B2* | 12/2016 | Hansen | A63F 13/12 |
| 2006/0100006 A1* | 5/2006 | Mitchell | G07F 17/32 |
| | | | 463/9 |
| 2008/0094417 A1 | 4/2008 | Cohen | |
| 2008/0146338 A1* | 6/2008 | Bernard | A63F 13/00 |
| | | | 463/42 |
| 2010/0283630 A1 | 11/2010 | Alonso | |
| 2011/0081973 A1* | 4/2011 | Hall | A63F 1/00 |
| | | | 463/42 |
| 2011/0306427 A1 | 12/2011 | Pawson | |
| 2011/0319148 A1* | 12/2011 | Kinnebrew | A63F 13/216 |
| | | | 463/1 |
| 2012/0122570 A1 | 5/2012 | Baronoff | |
| 2012/0157210 A1* | 6/2012 | Hall | A63F 13/65 |
| | | | 463/40 |
| 2012/0231887 A1* | 9/2012 | Lee | A63F 13/217 |
| | | | 463/39 |
| 2012/0315492 A1* | 12/2012 | Pujari | C04B 41/009 |
| | | | 428/446 |
| 2013/0072308 A1* | 3/2013 | Peck | A63F 13/65 |
| | | | 463/42 |
| 2013/0095924 A1 | 4/2013 | Geisner et al. | |
| 2013/0328927 A1 | 12/2013 | Mount et al. | |
| 2014/0163705 A1 | 6/2014 | Moller | |
| 2014/0340423 A1 | 11/2014 | Taylor et al. | |
| 2015/0231507 A1 | 8/2015 | Vu | |
| 2015/0360133 A1 | 12/2015 | MacCallum et al. | |
| 2015/0375117 A1 | 12/2015 | Thompson et al. | |
| 2016/0023116 A1 | 1/2016 | Wire et al. | |

* cited by examiner

FANTASY SPORT PLATFORM WITH AUGMENTED REALITY PLAYER ACQUISITION

FIELD OF THE INVENTION

The invention relates to fantasy sports games using augmented reality for player acquisition.

BACKGROUND OF THE INVENTION

Fantasy sports games have grown in popularity exponentially over the past twenty years. Users from around the world compete in fantasy sports leagues, tournaments, and matchups against family, friends, and even complete strangers. Fantasy sports games can be found for every sport out there, from football, basketball, baseball, and hockey to more obscure sports such as tennis, golf, and even eSports.

Fantasy sports gamers can choose from season long leagues, where each user assembles a roster of players and sets a lineup week-to-week, dynasty leagues, where each user assembles a roster and can hold onto players from one season to the next, and daily leagues, where each user assembles a new roster every week. Many different platforms for fantasy sports exist, with sources including ESPN, CBS, Yahoo, DraftKings, and Fan Duel. The variety of platforms and fantasy sports leagues continues to grow as fantasy sports continue to rise in popularity.

Historically, fantasy sports gaming involved selecting players from a list provided by the host website. A user entered his or her league page, viewed his or her fantasy teams, and chose available players to add to his or her team using well-known methods for electronic devices, such as point-and-click using a mouse or touchscreen. While this method is effective, it lacks a certain level of excitement in acquiring a player that the user really wants for his or her team.

In addition, younger users are becoming more and more involved in fantasy sports gaming. There is an interest in getting young people out and active in order to fight certain medical issues that can start early in life and often arise due to inactivity, such as heart disease, diabetes, etc. So, there is a motivation to create a fantasy sports game that encourages users to get out and be active.

To that end, certain fantasy sports games provide incentives to users to exercise and be more active. For example, U.S. Patent Application Publication No. 2014/0163705 seeks to motivate users to exercise by providing incentives and bonuses to their fantasy team performance. A user might earn bonus points by logging the most exercise time in the league or by logging more exercise time than his or her opponent that week. Or other incentives may be exercise performance based, such as draft order or waiver order. While these techniques are helpful, there remains a need for a fantasy sports game that encourages all users to be more active.

Fantasy sports gaming has historically been a sedentary activity, with little motivation for the users to be active and exercise. There is a need in the art for a fantasy sports game that inspires users to get outside and become actively engaged in the game. The advent of augmented reality in gaming provides a new manner of providing such motivation.

Augmented reality in gaming is a popular new trend. Games involving an augmented reality component, such as Pokemon Go, are growing in popularity. The augmented reality places digital images upon a real-world map of the user's surrounding environment using an imaging device and/or application from the user's mobile device. The augmented image changes as the user changes location and, thereby, changes the real-world map. The change in the augmented reality component of the game inspires users to actively move about during the gaming experience.

Fantasy sports gaming can therefore benefit from implementing an augmented reality component. Combining augmented reality with fantasy sports games can help to solve the need in the art for a manner of inspiring users, especially younger users, to exercise and be active during fantasy sports gaming.

SUMMARY OF THE INVENTION

It is thus an object of the present technology to inspire fantasy sports gamers to be more active by using augmented reality for fantasy sports player acquisition. More specifically, it is an object of the present technology to inspire users of daily fantasy sports leagues to actively select the players for their lineups using augmented reality regularly—on at least a weekly or even daily basis. It is a further object of the present technology to inspire users of season long leagues and dynasty leagues to select players through the draft using augmented reality, to claim players off of waivers using augmented reality, and to add free agents using augmented reality. It is also an object of the present invention to provide a system and method for implementing an augmented reality component for player acquisition into fantasy sports games.

To these ends, the present technology provides a system for assembling a fantasy sports team using augmented reality that includes one or more mobile devices in communication with a fantasy game server via a network. The fantasy game server is operable to host an augmented reality fantasy sports game. The fantasy game server employs a user interface module and an augmented reality module. The user interface module generates a user interface accessible by the one or more mobile devices. In preferable embodiments, the user interface module also manages the user's interactions with the system through the user interface, including sending and receiving information between the user and system, though not limited thereto.

The system also includes at least one database to store information about the users of the system and real-world sports players available for acquisition for the users' fantasy sports teams. In preferable embodiments, the system includes two databases—a user database that stores information about the users of the system and the fantasy sports team or teams associated with each user and a sports player database that stores information about the real-world sports players available for acquisition to the users' fantasy sports teams. Players from every sport are preferably included, from football and baseball to golf, soccer, and even eSports. In preferable embodiments, the system employs two databases, but the technology can operate just as effectively using a single database or using more than two databases. The present technology is not limited to any particular number.

The augmented reality module generates an augmented depth map and provides the augmented depth map to the users through the user interface. To generate the augmented depth map, the augmented reality module receives environmental information from the imaging device or application of the user's mobile device. The augmented reality module generates a real-world depth map based upon the environmental information received from the user's mobile device, generates a virtual depth map including images of one or more of the real-world sports players, and blends the real-world depth map with the virtual depth map to create the augmented depth map. The augmented depth map thus includes the environmental information received from the user's mobile device and supplements the real-world imagery with virtual images of sports players. The users of the system can then "capture" the sports players by interacting through the user interface. Upon "capturing" a player, the system updates the information in the user database to reflect the new player on one or more of the user's fantasy sports teams.

In some preferable embodiments of the present technology, the system further employs a promotion collection and redemption procedure. In such embodiments, the virtual depth map generated by the augmented reality module can include one or more images of promotion tokens that appear on the augmented depth map along with the images of the sports players. In some instances, the promotion tokens may appear alone on the augmented depth map if, for example, there are no available players nearby. The user interface operates to allow the user to collect the promotion tokens and keeps track of the number and type of promotions the user has collected. This information is preferably stored in a promotion bank associated with the user in the user database. Upon collection of a certain number of promotions from, for example Starbucks, Pepsi, Apple, etc., the user may redeem rewards from the promotor, such as a free coffee or beverage, etc. Other methods of redemption, including direct connection to the promotors' websites, are also possible in some embodiments. Those skilled in the art will recognize the various possibilities for the promotion token redemption process.

In some preferable embodiments of the present technology, the system provides an alert notification procedure to notify the user when a sports player the user is interested in is nearby. In such embodiments, the fantasy game server additionally includes a player geolocation randomization module and an alert notification module. The system also utilizes geolocation identification software operating on the user's mobile device to identify the user's geolocation. To employ the alert notification procedure, the user can select particular sports players he or she is interested in acquiring. These selections can be made through the user interface, and the system can store a flag associated with the selected players in the sports player database.

The player geolocation randomization module can then generate an algorithm for providing a geolocation for each of the sports players in the sports player database. The sports players' geolocation information is preferably stored in the sports player database. The algorithm will preferably continuously update the geolocation information about the players to simulate the players moving about. In this way, users from across the globe can participate in fantasy sports leagues together, and no user will have the advantage of superior players available for acquisition in his or her particular location.

The alert notification module operates to generate an alert when a sports player that the user has targeted (or flagged as interested in) enters the user's geographical location. More specifically, the alert notification module receives information from the user's mobile device identifying the user's geolocation and compares the user's geolocation with the geolocations of the sports players randomly generated by the geolocation randomization module's algorithm. When a sports player "enters" a threshold radius of the user's geolocation, the alert notification module generates and sends an alert to the user's mobile device notifying the user that a sports player he or she has targeted is nearby. In some embodiments, the alert notification may be generic, simply telling the user an unnamed player is available, or may include more specific information, such as the player's name, team, position, or any combination of the three.

In some preferable embodiments, the alert notification module will also generate and send an alert notification if another user has "captured" a sports player the user was targeting, and the player is therefore no longer available. In daily fantasy leagues, where several users can choose the same sports players, this alert notification would not apply. But in season long and dynasty leagues, where only one user can own each sports player, an alert notification that a targeted player is no longer available is important information for the user. In such preferable embodiments, the alert notification that a targeted sports player is no longer available may again include more specific information, such as the player's name, team, position, or any combination of the three. The alert notification may also suggest a substitute player, for example at the same position or from the same team, that the user might be interested in targeting instead. Those skilled in the art will recognize the various applications of the alert notification procedure.

In certain preferable embodiments of the present technology, the system also generates a heat map depicting sports players located near the user. In some cases, only targeted sports players may appear on the heat map. In others, all available players may appear. In some embodiments, the heat map merely displays a generic indicator of the sports players' locations. In others, additional information, such as the player's name, team, position, or any combination of the three, may also appear on the heat map. Likewise, in some embodiments, the heat map will only depict players within a threshold radius of the user. Or the heat map may display the threshold radius and depict players both within and without the threshold radius. Those skilled in the art will recognize the numerous such variations and combinations available to the system.

To generate the heat map, the fantasy game server additionally includes a geographical map generation module, or heat mapping module for short. The heat mapping module receives information about the user's geolocation from the user's mobile device and generates a heat map of the surrounding area. The heat mapping module can then populate the heat map with indicators of sports players' geolocations based upon the geolocation information stored in the sports player database. In embodiments in which the heat map also displays further information about the players, that information is retrieved from the sports player database as well.

In preferable embodiments that employ both the heat map and the promotion collection and redemption procedure, the heat mapping module may also populate the heat map with indicators of promotion tokens. Similarly, in preferable embodiments that employ both the heat map and the alert notification procedure, the user may access the heat map upon receiving an alert notification that a targeted sports player is nearby. The heat map can assist the user in locating the specific sports player he or she wishes to capture nearby. Upon reaching the targeted sports player's geolocation the user can then access the augmented depth map to "capture" the sports player or players depicted. The augmented depth map and heat map are accessible to the user through the user interface, as are other information and options.

For example, preferable embodiments of the system permit the user to set the threshold radius used for the generation of alert notifications, in embodiments of the system employing the alert notification procedure. In some embodiments, users may also turn alert notifications on or off, set time periods during which they do or do not wish to received alert notifications, and set a limit to the number of alert notifications they receive, for example based on the sports players position or team or simply restricting the number of alert notifications received per hour or per day. And in embodiments that employ the promotion collection and redemption procedure, the user may turn promotion tokens on or off. Other options and variations will be ascertainable to those skilled in the art.

To meet its objectives, the present technology also provides a method for assembling a fantasy sports team using augmented reality employing the following steps. The user first selects one or more sports players he or she wishes to target from a sports player database. A flag is preferably stored in the sport player database to denote targeted players. An algorithm is generated to assign random geolocations to the sports players in the sports player database. The geolocations are preferably stored in the sports player database and are preferably randomly updated on a continuous basis to effectuate sports player "movement" across the globe. The user's geolocation is detected using geolocation identification software on the user's mobile device. The user's geolocation is compared with the geolocations assigned to the sports players the user has selected, and an alert notification is generated and sent to the user's mobile device when a sports player the user has selected enters a threshold proximity of the user's mobile device. An augmented depth map is then generated by receiving environmental information from an imaging device or application on the user's mobile device, generating a real-world depth map based upon the environmental information, generating a virtual depth map containing images of one or more sports players from the sports player database, and blending the real-world depth map with the virtual depth map to create the augmented depth map. The augmented depth map is then viewable to the user through a user interface accessible by the user's mobile device. The user then "captures" the sports player he or she selected by interacting with the augmented depth map through the user interface. A user database storing information about one or more fantasy sports teams associated with the user is then updated to reflect the user's addition of the "captured" sports player.

Preferable embodiments of the method employ both a user database and a sports player database. However, the method is just as effectively employed using a single database or using more than two databases. The present technology is not limited to using any particular number of databases.

In some preferable embodiments, the method includes additional steps for "capturing" and redeeming promotion tokens. In such embodiments, the virtual depth map may include both images of sports players and images of promotion tokens (or, indeed, only images of promotion tokens), which are blended with the real-world depth map to generate the augmented depth map. The user may then "capture" the promotion tokens in the same manner as "capturing" the sports players, and information about the promotion tokens "captured" by the user can similarly be stored in the user database. Thereafter, the user may redeem rewards from the promotors based upon the number of promotion tokens collected, etc.

In certain preferable embodiments, the method also includes generating a heat map to assist the user in acquiring targeted sports players. The heat map depicts the sports players nearby that are available for acquisition. The user can then access the heat map through the user interface, locate a targeted sports player, and proceed to the targeted player's location to capture the player through the augmented depth map accessible through the user interface. In embodiments also including steps for "capturing" and redeeming promotion tokens, the heat map can also depict the locations of promotion tokens. In preferable embodiments of the heat map, information about the sports players, such as the player's name, team, position, or any combination of the three, is also depicted. Additional information about the promotion tokens, such as the promotor, may also be reflected on the heat map.

In some preferable embodiments, the method also includes steps for generating and sending an alert notification to the user when another user "captures" a sports player the user was targeting. Such alert notifications are more useful to the users in season long and dynasty fantasy sports leagues than they are to users in daily fantasy sports leagues, as would be understood by those of skill in the art.

Those skilled in the art will appreciate the many alterations possible to the presently described technology. The present technology is not limited to the embodiments and arrangements described above. Other objects of the present technology and its particular features and advantages will become more apparent from consideration of the following drawings and detailed description of the technology.

DETAILED DESCRIPTION OF THE INVENTION

Figure 1:
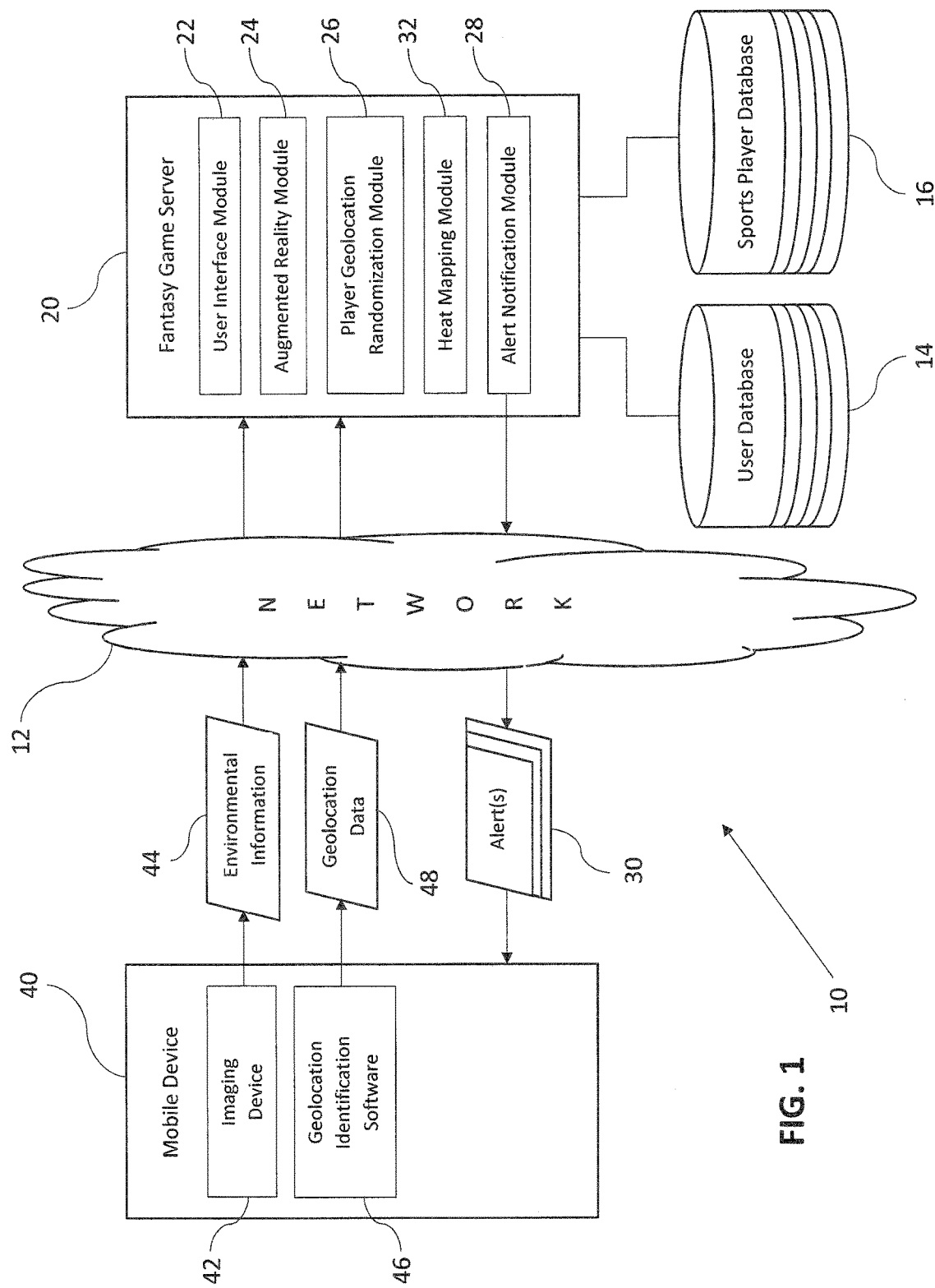
FIG. 1 is a schematic representation of a system according to exemplary embodiments of the present technology.

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

The present invention merges traditional fantasy sports with augmented reality. Contestants would assemble teams via an augmented reality environment, where they would capture players via their wireless or mobile device. Players would combine their background in traditional fantasy sports, points, etc. with searching their environment for players to represent their team. The pool of players available will appear, disappear, reappear, and/or consistently or sporadically float around within a radius or other defined area relative to a contestant, either randomly or in algorithmic patterns. Contestants can capture players in the augmented reality world to assemble their fantasy team.

In certain embodiments, once a team is assembled, contestants can continue searching for better players around their radius in order to improve their fantasy team. If they capture a player who they deem "more valuable" then an existing player, the contestant can drop the player who they feel is inferior and keep the player who is deemed "more valuable" within a finite period of time. The released player would then return back into the augmented reality world for other participants to pick up (available player).

The game would be played using a wireless or mobile device, such as, for example, a smart phone or tablet, and would access the camera feature of that device, which would deliver the reality. Software would implement the virtually available players into the augmented reality. In certain embodiments, the game application would feature a "heat map" showing dots which represent the available players. In some cases, the names and/or additional information concerning the players is shown on the map, while in others, the contestants would need to access and find the players to determine who the player is and if they would want them on their team. In some embodiments, the contestant would swipe the available player to capture him/her and add them to their team, though other methods of capturing the player may be employed, such as by the contestant coming within a certain proximity of the location where the player is virtually represented.

The game application could then track the performance and progress of the contestant's team, and the performance and progress of the teams of other contestants with whom the contestant is competing, according to established rules, such as, for example, those used during known fantasy football schemes. The game would require players to both have skill in fantasy sports and also physically search their surrounding areas for players to capture.

Preferable embodiments of the application operate as follows. One or more users access the application using one or more electronic devices, preferably mobile devices. The user enters identification verification information to access the application's user interface. The user interface preferably appears as a typical fantasy sports application, as would be understood by those familiar with the art. For example, the application might include a login page, a "My Team(s)" or "My Lineups" page, a team roster page, an available players page, a news feed page, a matchup score page, a league scores page, a league standings page, a sports players page, opposing teams roster pages, a league transactions page, a team schedule page, a league settings page, a team settings page, a team transaction history page, a league draft history page, a user performance history page, a message board for interacting with other users, a player keeper selection page, a lobby page listing available leagues and tournaments, preferably searchable by sport, etc. The above listed pages are strictly exemplary, and those knowledgeable and skilled in the art will recognize many other possible variations and options for fantasy sports applications.

Upon entering the fantasy sports application, users of the present technology are given the opportunity to add players to their one or more teams. To do so, a user may access the sports players page to view players available to add. In season long and dynasty leagues, the sports players page may only depict available players or may include an option to limit the players listed to those available. The user may then select a player he or she is interested in adding. In preferable embodiments, selecting a player adds a flag that allows the system to keep track of the sports players the user is interested in adding. The flags are preferably stored in a database along with information about the sports players, such as player name, sport, team name, position, etc.

Upon selecting a player the user is interesting in adding to one or more of his or her fantasy teams, the user may be redirected to an augmented depth map depicting a digital image of the selected player along with the user's immediate environment, in some embodiments of the present technology. In other preferable embodiments, the user may open the augmented depth map upon receiving a notification that a selected player is nearby. In some preferable embodiments, the user may access a heat map depicting his or her immediate geographical location and the "locations" of the player or players he or she has selected. In such embodiments, the user may then follow the heat map to the selected player's geolocation and open the augmented depth map to view the selected player. The user then "captures" the depicted player to add the player to his or her fantasy team or teams.

To generate the heat map, the present technology receives geolocation information from the user's electronic device, preferably a mobile device. The present technology then randomly assigns a geolocation for each sports player and depicts an indicator of each player's location on the heat map, in preferable embodiments that employ a heat map. The player geolocations are preferably updated in real-time as if the players are moving about the area. In some embodiments, the player geolocations may be world-wide. In other embodiments, the player geolocations may be limited to more restricted areas, such as a country, state, city, or even more limited area. In preferable embodiments, the users may be able to set limits for the players' geolocations in order to facilitate "capturing" the players selected.

The present technology then generates a heat map depicting the user's geolocation and the players' geolocations. The user may access the heat map through his or her electronic device, preferably a mobile device. The user may then approach the depicted location of a selected player and access the augmented depth map to view the digital image of the selected player and "capture" the player if the user so chooses. In order to generate the augmented depth map, the present technology receives environmental information from an imaging device on the user's electronic device, such as the camera included on many mobile devices. The present technology takes the environmental information received from the imaging device and generates a real-world depth map, generates a virtual depth map containing digital images of one or more sports players, and blends the real-world depth map with the virtual depth map to generate the augmented depth map. The user then accesses the augmented depth map using his or her electronic device, preferably a mobile device, and can "capture" the one or more players depicted.

Because the sports players a user selects may have geolocations distributed across the globe, preferable embodiments of the present technology include alert notifications when a selected player is nearby. Such embodiments generate an alert notification when a selected player is within a threshold radius of the user's current geolocation. In preferable embodiments in which the sports players are "moving" (meaning the randomly assigned geolocations of the sports players are updating in real-time), the alert notification might be generated when the sports player moves into the user's threshold radius. In other embodiments, in which the sports players' geolocations are stagnant, an alert notification may be generated when a mobile user comes within the threshold radius of the sports player's geolocation. In preferable embodiments, the user may set the threshold radius necessary for generating an alert notification.

Upon receiving an alert notification that a selected player is nearby, the user may access the heat map, in some preferable embodiments, to identify the precise location of the sports player. The user may then approach the sports player using the heat map to track the player's location and, upon reaching the player's location, access the augmented depth map to "capture" the player and add him or her to the user's one or more fantasy sports teams. The user may repeat this process until he or she has filled out his or her roster with eligible players. In season long and dynasty leagues, the same process may be used to add additional player or replace players the user no longer wants on his or her fantasy team(s).

In preferable embodiments, the heat map and/or the augmented depth map may also depict other obtainable objects. For example, some embodiments of the present technology may include tokens that allow user to perform certain functions associated with fantasy sports games, such as making trades or acquiring additional or replacement players, putting a player in the user's lineup for a particular matchup, placing a player on the user's bench or on injured reserve, etc. Those skilled in the art will recognize additional applications of the token system.

One particularly preferable application of the tokens system includes promotion tokens for particular brands and/or products. The users of the system might capture such promotion tokens and store them in a promotion bank. Upon capturing enough of the promotion tokens, the users may be able to exchange them for free products, discounts, etc. In this manner, companies could use the present technology to advertise their brand and inspire users to purchase their products and services. Those skilled in the art will recognize additional possibilities and other marketing applications of the present technology, all of which are included in this disclosure.

Referring now to FIG. 1, depicted is a schematic representation of exemplary embodiments of the claimed technology. The depicted system 10 employs a mobile device 40 and a fantasy game server 20 in electronic communication over a network 12. The mobile device 40 may be, for example, a smartphone, tablet, personal digital assistant, handheld game console or other portable gaming system, smart glasses or other optical head-mounted display, or other portable device suitable for implementing the system described herein. The system 10 also employs at least one database, and preferably employs a user database 14 and a sports player database 16. The user database 14 stores information about users of the system. For example, the user database 14 stores system options selected by the user, if any, information about the user's fantasy teams, information about the sports players added to the user's fantasy teams, etc. This list is not intended to be limiting in any way, as those skilled in the art will recognize much additional information that could be stored on the user database 14.

The sports player database 16 stores information about a plurality of real-world players from one or more sports, including football, baseball, basketball, hockey, soccer, golf, tennis, eSports, and any other sports amenable to fantasy games. The information about the sports players can include, for example, the player's name, team, and position, injury status, latest news, owned-by-user information, availability status (owned, on waivers, free agent), whether the player has been flagged by an owner, etc. Again, this list is not intended to be limiting in any way, as those skilled in the art will recognize much additional information that could be stored on the sports player database 16. In addition, while the system preferably employs two databases, the depicted system could operate just as effectively using a single database or using more than two databases, which may be part of, or in communication with, the fantasy game server.

The fantasy game server 20 is operable to host an augmented reality fantasy sports game. The fantasy game server includes a user interface module 22 and an augmented reality module 24. The user interface module 22 generates a user interface that facilitates interaction between the user on his or her mobile device 40 and the fantasy game server 20. The user interface module 22 also manages the interactions of the user with the system 10. For example, the user interface module 22 recognizes user inputs from the user's mobile device 40 through the user interface. The user interface module 22 also operates to make updates to the user database 14 and the sports player database 16 when user interactions with the user interface require that they be updated.

The user interface module 22 also operates to trigger the fantasy game server's 20 other modules in response to user interactions with the user interface. For example, the user interface module 22 triggers the augmented reality module 24 to generate an augmented depth map when the user seeks to access the augmented depth map through the user interface. Similarly, the user interface module 22 triggers the heat mapping module 32 (also referred to as the geographical map generation module) to generate a heat map when the user seeks to access the heat map through the user interface. The augmented reality module 24 and the heat mapping module 32 are discussed further below. Those skilled in the art will recognize the various additional functions available to the user interface module 22, which is not limited to the above described functionality.

The augmented reality module 24 generates the augmented depth map accessible by the user through the user interface using his or her mobile device 40. To generate the augmented depth map, the augmented reality module 24 first generates a real-world depth map and a virtual depth map. The virtual depth map includes depictions of digital images of one or more sports players from the sports player database 16. The real-world depth map is generated based upon the user's environment. To generate the real-world depth map, the augmented reality module 24 retrieves environmental information 44 from an imaging device 42 of the user's mobile device 40. The augmented reality module 24 then generates a real-world depth map based upon the environmental information 44. The augmented reality module 24 then blends the real-world depth map with the virtual depth map to generate the augmented depth map, which depicts exactly what the user would see through the imaging device 42 but adds the digital images of the one or more sports players depicted in the virtual depth map. Thus, it appears to the user that the sports player(s) are actually present at the user's location.

The digital images of the one or more sports players depicted in the augmented depth map may be stationary or, preferably, be performing certain activities. For example, the sports players might be performing an activity associated with the sport the player plays. Or the sports player might be performing an activity associated with the user's location, such as walking a dog through a park when the user is in a park. Those skilled in the art will recognize the many possible applications of the digital images of the sports players generated by the augmented reality module 24, and the present technology includes all such variations and applications.

Further, the virtual depth map and, thereby, the augmented depth map may include other digital images in addition to the digital images of the one or more sports players. For example, some embodiments of the present technology employ tokens that can be collected by the users of the system. The tokens may enable the users to perform certain functions associated with fantasy sports games, such as trading, adding and/or dropping players from their team, making lineup changes, etc. Preferable embodiments also include a promotion token system for collecting and exchanging tokens for products and services. In such embodiments, the augmented depth map could include promotion tokens depicting, for example, the Pepsi, Starbucks, Apple, or Target logo. The user would then have the option of "capturing" the promotion tokens (or other tokens) through the augmented depth map in the same manner as the users "capture" sports players. The tokens collected could then be stored in the user database 14 as, for example, a promotion bank, and the user could exchange the tokens for products or services upon collection of a sufficient number of the tokens. For example, when a certain number of a particular type of token is captured, the system may send the user an email or text message containing a link or image for a coupon, or as another example, the system may generate a virtual coupon or code that is stored on the mobile device 40 that can later be scanned for redemption, or as yet another example, may provide a special link directly to a token sponsor's webpage. Those skilled in the art will recognize alternative ways of implementing the promotion tokens system using the present technology, all of which are incorporated herein.

In the preferable embodiment of the present technology depicted in FIG. 1, the fantasy game server 20 further includes a player geolocation randomization module 26, an alert notification module 28, and a heat mapping module 32. The player geolocation randomization module 26 operates to assign a random geolocation to each sports player stored in the sports player database 16. The geolocation is stored in association with the sports player in order to provide a "location" for the digital image of the sports player depicted in the augmented depth map. This "location" determines whether a user of the system will be able to view each sports player's digital image upon accessing the augmented depth map on his or her mobile device 40. If the user is close enough to the sports player's "location," the player's digital image will appear on the augmented depth map. If not, the augmented depth map will simply depict the environmental information 44 received from the imaging device 42. The pool of digital images that may displayed can be limited in various ways, such as all available players, or only those players flagged by that particular user. Likewise, the assigned geolocations may apply only for certain predetermined or random time intervals.

The alert notification module 28 generates and sends one or more alerts 30 to the user's mobile device 40 when a targeted player enters a threshold radius of the user's geolocation. Though not depicted in FIG. 1, the users (or a game administrator or "commissioner") may set the threshold radius required for generating an alert through the user interface, among other system options. To generate an alert, the alert notification module first receives geolocation data 48 from the geolocation identification software 46 operating on the user's mobile device 40. Geolocation identification software is commonly used on mobile devices, such as cell phones. Upon receiving the user's geolocation data 48, the alert notification module compares the user's geolocation with the geolocations for the sports players generated by the player geolocation randomization module 26. If a sports player's geolocation is within the threshold radius of the user's geolocation, the alert notification module 28 generates and sends an alert 30 to the user's mobile device 40. The alert 30 may simply indicate that a sports player has entered the user's threshold radius or the alert 30 may contain more specific information, such as the sports player's name, sport, team, position, etc. Those skilled in the art will understand the various levels of information that the alerts 30 may contain. The present technology is not intended to be limited to any particular embodiment for the alerts 30.

In preferable embodiments, the user may specify which sports players he or she wishes to receive alerts 30 for by flagging those players through the user interface. The flags are preferably stored in the sports player database 16, and the alert notification module 28 will generate an alert 30 only if a player the user has flagged has entered the user's threshold radius. Thus, the alert 30 may simply indicate that a flagged player has entered the user's threshold radius or may contain more specific information such as the player's name, sport, team, position, etc., as discussed above.

The preferable embodiment of the present technology depicted in FIG. 1 also includes the heat mapping module 32. The heat mapping module 32 generates a heat map depicting the user's geolocation and the current geolocations (generated by the player geolocation randomization module 26) of the sports players stored in the sports player database 16. The users can access the heat map to assist them in locating the sports players available in their vicinity. The information depicted on the heat map may merely include an indication of the location of a random sports player. Or, in some embodiments, the heat map may include more specific information about the player, such as the player's name, sport, team, position, etc. In preferable embodiments, the users and/or game administrator may determine how much information is depicted on the heat map by setting system options through the user interface. The players depicted may be those flagged for the particular user, or alternatively, may comprise all available players. The user may access the heat map after receiving an alert 30 from the alert notification module 28 or at any time the user wishes to explore the augmented reality environment and/or "capture" one or more sports players.

The heat map generated by the heat mapping module 32 may also depict other virtual objects, such as promotion tokens and other tokens. Again, the amount of information about the virtual objects might be limited to merely an indication of the virtual object's location or might include information about the type of virtual object (promotion token, trade token, add/drop token, set-lineup token, etc.), the brand (for promotion tokens), etc. Those skilled in the art will recognize the various alternative arrangements and applications for the heat map, and the present technology is not intended to be limited to any particular embodiment.

Figure 2:
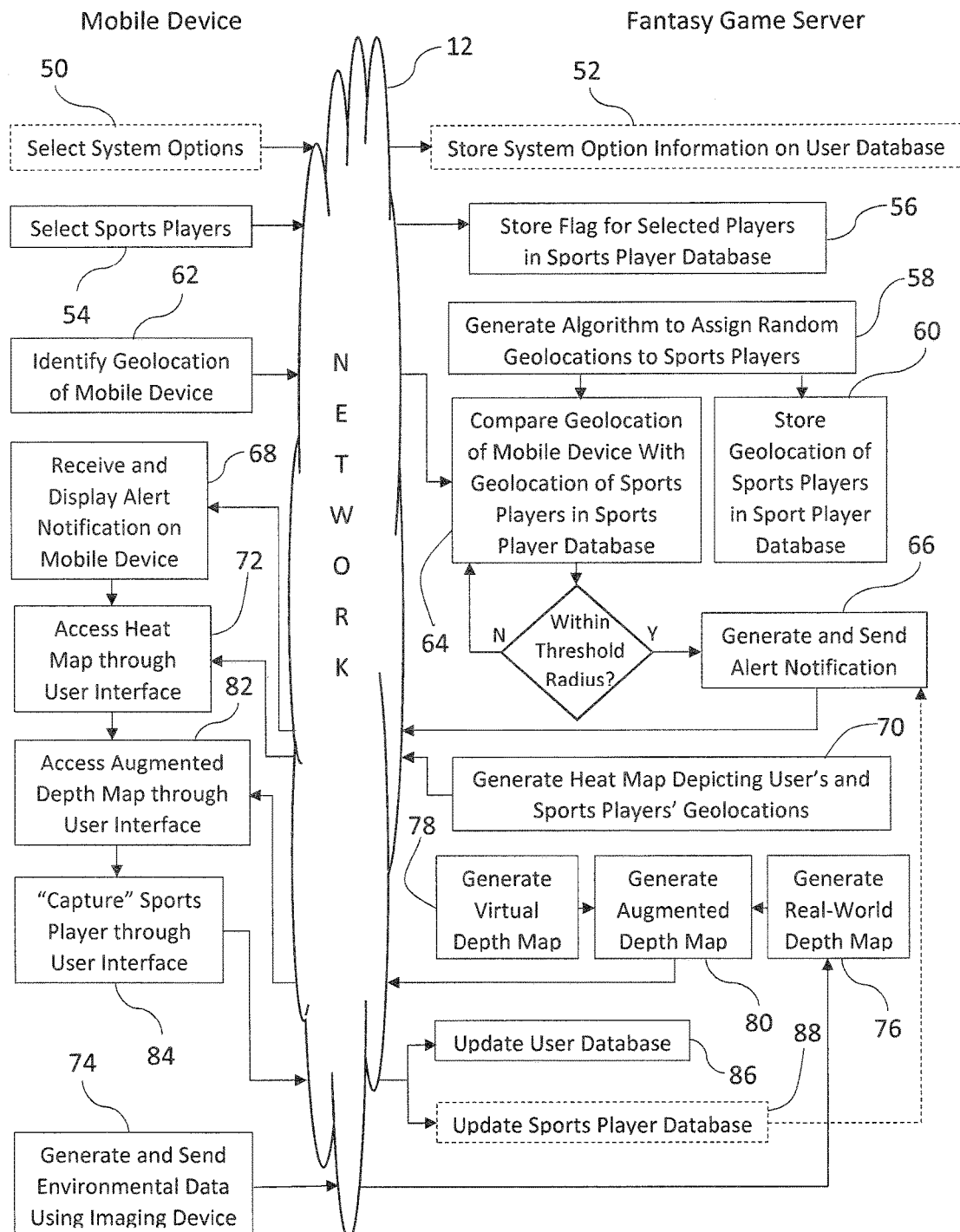
FIG. 2 is a schematic representation of a method that can be employed by the exemplary system of FIG. 1, according to exemplary embodiments of the present technology.

Referring next to FIG. 2, depicted is a schematic representation of an exemplary method employable by the exemplary system depicted in FIG. 1. Upon accessing the fantasy sports application employing the present technology, a user employing the method may optionally select system options 50, which the system may store on the one or more databases, preferably on the user database 52. Available system options preferably include turning on or off alert notifications, turning on or off promotion tokens, setting the threshold radius for alert notifications, selecting whether the user wishes to receive alerts for only flagged players or all available players, setting time of day during which the user wishes to receive alert notifications, and setting the number of alerts the user wishes to receive based on time period, the sport the alerts relate to, player team or position, etc. Additional system options relating to the fantasy sports platform may also be available, as understood by those skilled in the art. Further, preferable embodiments of the present technology will employ default system settings, so the user may choose to change the defaults or leave them as is.

The user next selects one or more sports players 54 the user wishes to add to his or her one or more sports teams. The system then stores a flag for the selected players in the one or more databases, preferably in the sports player database 56. The user can select sports players he or she wishes to flag by accessing the user interface using his or her mobile device. For example, the user might access a "players" page or "available players" page and select a "queue" or "tag" box associated with a sports player listed. That selection would then trigger the system to generate a flag for that sports player to indicate that the user is interesting in adding the player to his or her fantasy team or teams.

Meanwhile the player geolocation randomization module 26 generates an algorithm to assign random geolocations to the sports players 58 and stores the geolocation information, preferably in the sports player database 60. The system receives the user's geolocation from the user's mobile device 62 over the network 12 and compares the user's geolocation with the randomly assigned geolocations of the players in the sports player database 64. If a sports player has a geolocation within the threshold radius of the user's geolocation, the system generates and sends an alert notification 66 back to the mobile device across the network 12, and the mobile device displays the alert notification 68. As discussed above, the alert notification might merely indicate a sports player is nearby or might contain more specific information about the player, such as the player's name, sport, team, position, etc. In preferable embodiments, the system generates and sends and alert notification 66 only if a sports player that the user previously selected 54 is within the threshold radius of the user's mobile device.

Upon receiving the alert notification, the user may preferably access a heat map through the user interface 72. The heat map is generated by the system and depicts the user's geolocation and the sports players' geolocations 70. In preferable embodiments, the number of sports players depicted and the information about the sports players may be set and controlled by the user. For example, the user may set the heat map to cover only a certain distance, such as a mile or the threshold radius the user has set, may set the heat map to depict only players of a particular sport, such as football or baseball, may set the heat map to depict only selected players or to depict only players and no tokens (promotion tokens or otherwise) or only tokens and no players, may set the heat map to provide only player names or player name, team, and position, etc. Some preferable embodiments of the technology might go so far as to even limit the particular players available during particular time periods.

For example, during the draft of a season long fantasy sports league, the heat map might only display the top 15 players (ranked by the fantasy sports application) and the system might limit each user to acquiring a single player for the first 15 minutes of the draft. In this manner, the users could be seen as partaking in a "first round" of the draft. Subsequent draft rounds could be handled similarly. Those skilled in the art will recognize alternative manners of implementing the fantasy sports game using the system's options and the heat map, and the present technology is not limited to any particular arrangement.

The user's mobile device also sends environmental data to the system using the mobile device's imaging device 74. The system uses the environmental data to generate the real-world depth map 76 depicting the environment the user would see through the imaging device on his or her mobile device. The system also generates the virtual depth map 78, which depicts digital images of sports players from the sports player database and, in preferable embodiments, depicts digital images of promotion tokens, trade tokens, add/drop tokens, etc. The system then blends the real-world depth map with the virtual depth map to generate the augmented depth map 80, combining the environmental data with the virtual images so that it appears to the user that the digital images are integrated into the user's surroundings.

The user can then access the augmented depth map through the user interface 82 on his or her mobile device and "capture" the targeted sports players and/or tokens through the user interface 84. Upon capturing one or more sports players and/or tokens, the system updates the user database 86 to reflect the changes to the user's fantasy sports team(s) and/or the user's user profile, including for example the promotion bank. In some embodiments, the system may also update the sports player database 88 to reflect the change in the status of the player or players "captured." In daily leagues, this step might assist users in analyzing how many other users "captured" a particular player for the week's matchups. In season long and dynasty leagues, this step is necessary to indicate that the "captured" player is no longer available to other users to capture (as only one user in a season long or dynasty league can own a particular player). Further, in preferable embodiments, the system will generate and send an alert notification 66 in season long and dynasty leagues when a player the user has selected is "captured" by another user. In some such preferable embodiments, the alert may additionally suggest alternative players, for example in the same sport and at the same position, that the user may wish to target now that the "captured" player is no longer available. This description of the method depicted in FIG. 2 is strictly exemplary, and the present technology is in no way limited thereto.

Figure 3B:
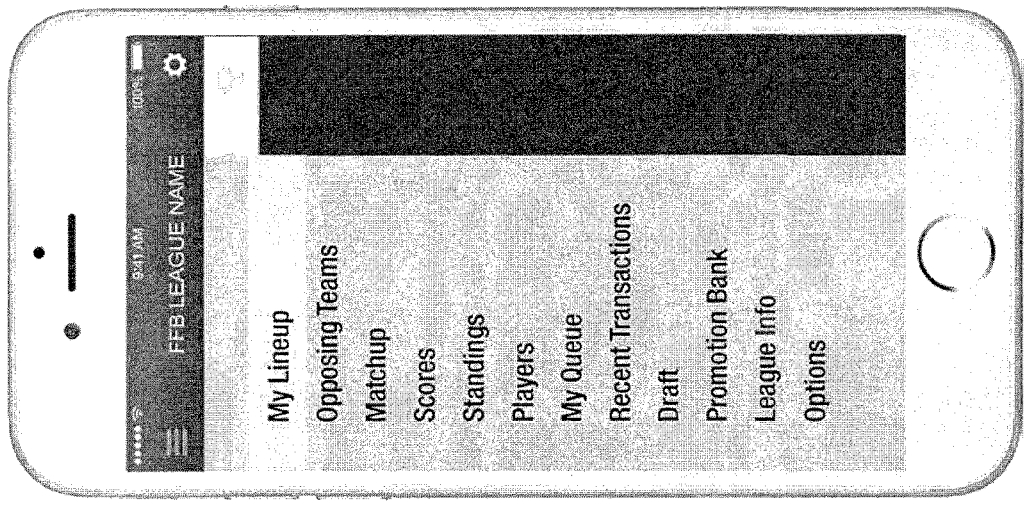
FIG. 3b is an image of a menu page popup employing the exemplary embodiments of the present technology depicted schematically in FIGS. 1 and 2.
Figure 3A:
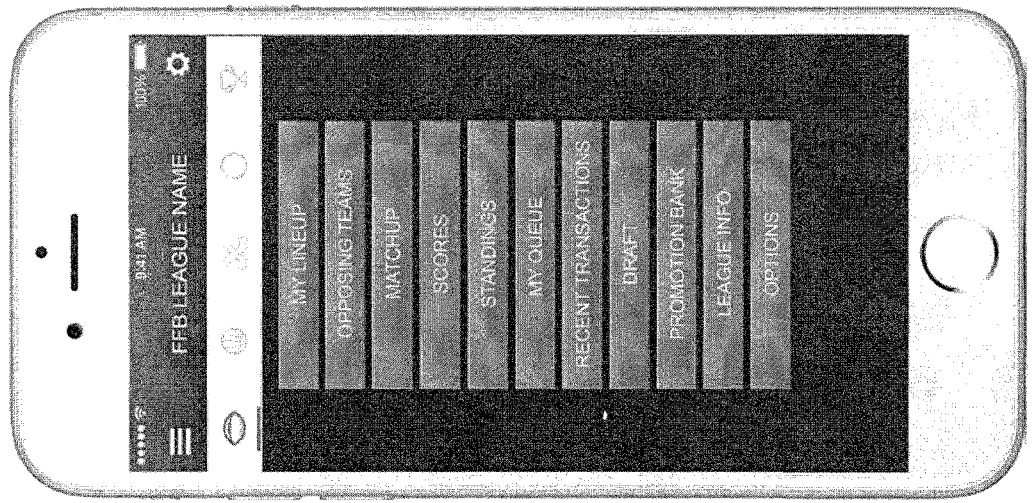
FIG. 3a is an image of a fantasy sports league home page employing the exemplary embodiments of the present technology depicted schematically in FIGS. 1 and 2.

Referring next to FIG. 3*a*, depicted is an image of a fantasy sports league home page implementing exemplary embodiments of the present technology. The home page is similar to the typical fantasy sports league home pages used by commonly trafficked hosts, such as ESPN, Yahoo, CBS, etc., and the present technology is intended to be compatible with such fantasy sports applications. The fantasy sports league home page may be accessed directly as a host's web page and/or via a dedicated software application residing on the mobile device 40 that communicates with the host. Preferably, the league home page has a unique name for identifying the particular league the user is accessing, as depicted. Also as depicted, the league home page preferably identifies the sport for the fantasy sports league. In this case, the sport is identified using a bar near the top with an image of different sports balls; the football is highlighted denoting that the selected league is a fantasy football league. The league home page also provides the user with the ability to navigate fantasy league application by selecting various options, such as reviewing the user's lineup, checking the scores around the league, and entering the league draft, for example. The depicted example league home page also includes an option for the user to review the number of promotion tokens he or she has collected through a "Promotion Bank" page.

FIG. 3*b* depicts a popup menu with the same navigational options as found in the league home page depicted in FIG. 3*a*. The popup menu can typically be accessed from any other page on the fantasy sports application using preferable hosts. The navigational options depicted in FIGS. 3*a* and 3*b* are strictly exemplary, and the present technology is not limited to any particular arrangements for the fantasy sports league home page or menu popup.

Figure 4:
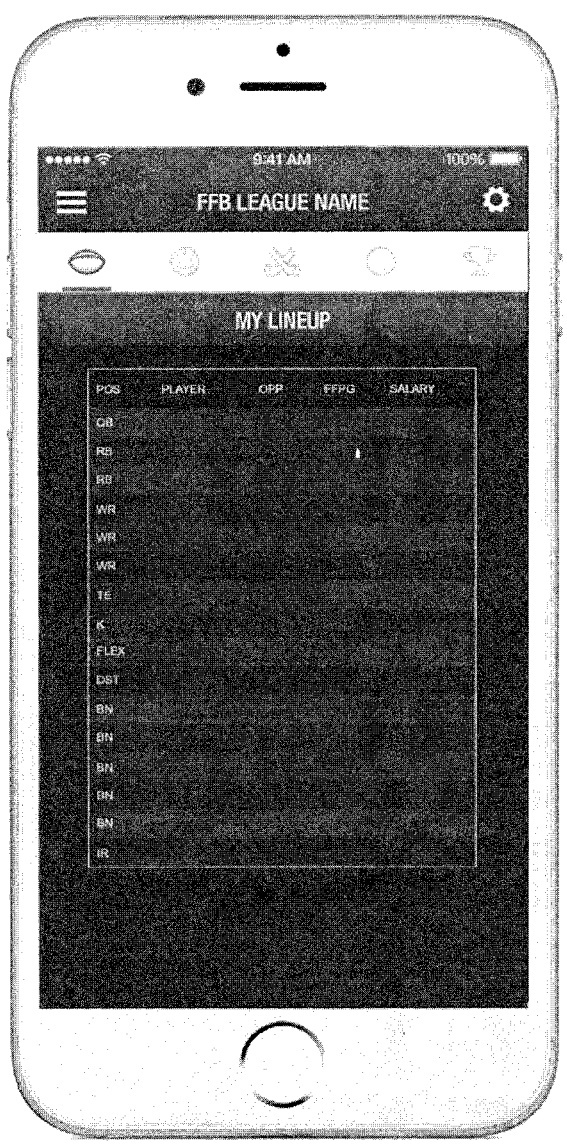
FIG. 4 is an image of a lineup page for a fantasy sports league employing the exemplary embodiments of the present technology depicted schematically in FIGS. 1 and 2.

FIG. 4 depicts a typical "lineup" page implementing exemplary embodiments of the present technology. The "lineup" page is similar to the typical season long and dynasty fantasy sports league "lineup" pages used by commonly trafficked hosts, and the present technology is intended to be compatible with such fantasy sports applications. The depicted example is again for a fantasy football league and thus includes lineup positions for quarterbacks, running backs, wide receivers, tight ends, kickers, and team defenses. The lineup also contains spots for reserve players, the bench spots, and injured players, the IR spots. In some preferable embodiments of the present technology, a user may move a player from a bench position into an active lineup position only if he or she has collected a sufficient number of tokens using the present technology's augmented reality depth map. A similar "lineup" page without bench or IR spots would typically be employed for a daily fantasy sports league. Because the users select a new lineup for each day's or week's games, there is not typically a need for holding player in a reserve role in a bench or IR spot. In FIG. 4, the lineup is empty, meaning the user has not yet acquired any players using the present technology. The lineup arrangement depicted in FIG. 4 is strictly exemplary, and the present technology is not limited to any particular arrangements for the fantasy sports league "lineup" page.

Figure 5:
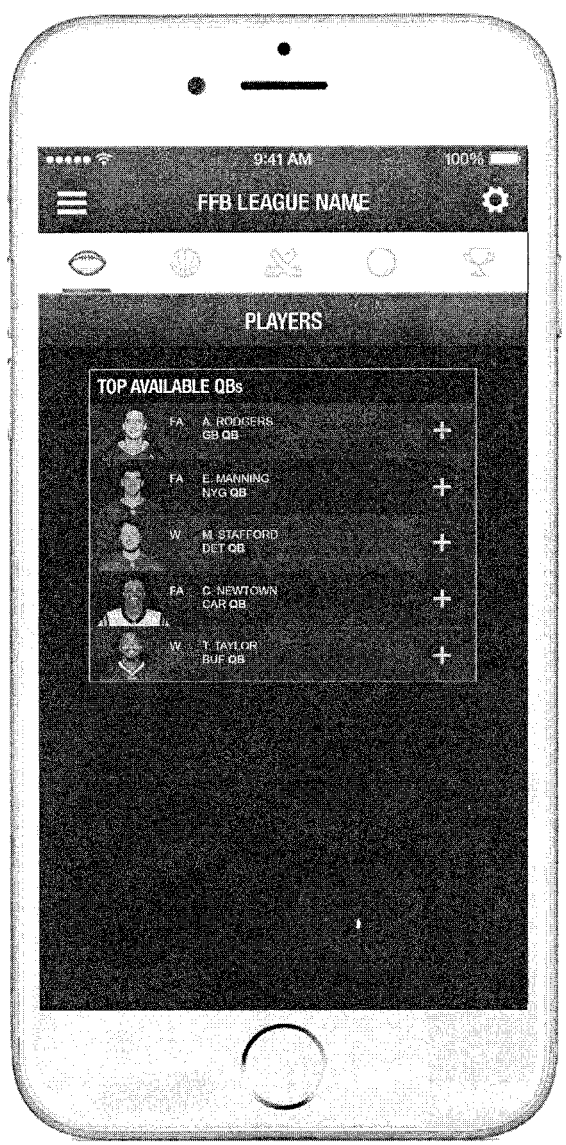
FIG. 5 is an image of an available players page for a fantasy sports league employing the exemplary embodiments of the present technology depicted schematically in FIGS. 1 and 2.

FIG. 5 depicts a typical "players" page implementing exemplary embodiments of the present technology. The "players" page is similar to the typical fantasy sports league "players" pages used by commonly trafficked hosts, and the present technology is intended to be compatible with such fantasy sports applications. In the depicted example, the fantasy sports league is a fantasy football league and the top available quarterbacks are listed. There is also an indication of whether the listed player is a "free agent" (FA) or is, instead, "on waivers" (W). The designation between "free agents" and players "on waivers" is more applicable to season long and dynasty leagues that it is to daily leagues, and those skilled in the art will understand the distinction.

Preferable fantasy sports applications provide an "add" button next to each listed available player, in this case, a plus sign (+). In fantasy sports applications before the advent of the present technology, the add button would simply place the selected player in the user's lineup (in daily leagues or if the player was designated a "free agent" in season long and dynasty leagues) or create a waiver claim for the selected player (if the player was designated "on waivers" in season long and dynasty leagues). However, for fantasy sports applications employing the present technology, the add button creates a flag, preferably stored in the one or more databases, that the user is interested in "capturing" that player for his or her fantasy team. In preferable embodiments of the present technology, the flag will trigger alert notifications when the flagged player enters the threshold radius of the user. The "players" page depicted in FIG. 5 is strictly exemplary, and the present technology is not limited to any particular arrangements for the fantasy sports league "players" page.

Figure 6:
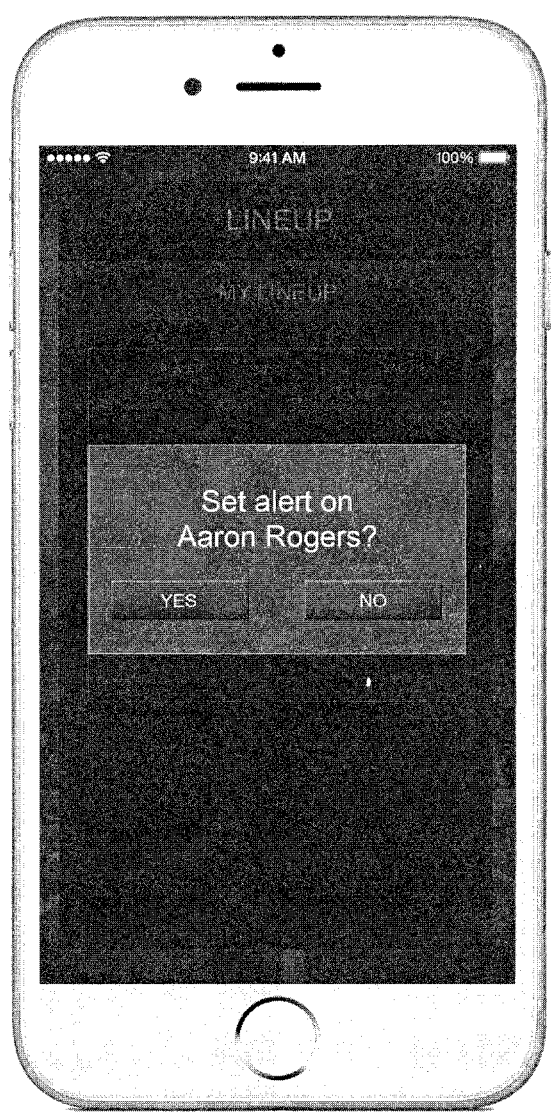
FIG. 6 is an image of a set alert popup for a fantasy sports league employing the exemplary embodiments of the present technology depicted schematically in FIGS. 1 and 2.

Upon clicking the add button next to an available player, preferable embodiments of the present technology present the user with a "set alert" popup, an example of which is depicted in FIG. 6. By agreeing to set an alert, a user of the preferable embodiments of the present technology flags that player for an alert notification when the player enters a threshold radius of the user's geolocation. As described above, the user's geolocation is preferably determined using geolocation identification software operating on the user's electronic device, preferable a mobile device. And the flagged player's geolocation is preferably determined by the algorithm generated by the present technology's player geolocation randomization module. FIG. 6 is strictly exemplary. Some embodiments of the present technology may employ a different "set alert" popup than that depicted in FIG. 6 or, indeed, no popup at all, and the present technology is not limited to any particular arrangement or use of the "set alert" popup.

Figure 7:
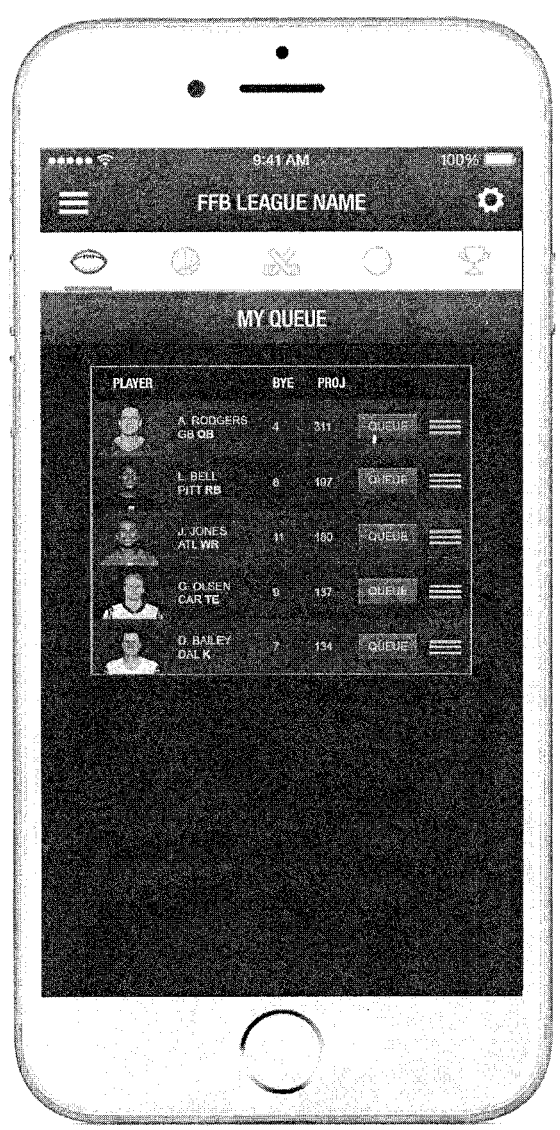
FIG. 7 is an image of a queued players page for a fantasy sports league employing the exemplary embodiments of the present technology depicted schematically in FIGS. 1 and 2.

FIG. 7 depicts a "queue" page for a fantasy sports league employing exemplary embodiments of the present technology. The "queue" page is preferably similar to a "watch list" page or "flagged players" page typically used by commonly trafficked hosts, and the present technology is intended to be compatible with such fantasy sports applications. As depicted, the user has flagged Aaron Rodgers, quarterback for the Green Bay Packers football team. Also depicted are additional players that the user has flagged. In preferable embodiments of the present technology, a notification is set for each of the queued players and an alert will be sent to the user's mobile device if any of the queued players enters the threshold radius of the user's geolocation. Preferable embodiments of the queue page include information about the player and a button to unflag the player, in this example, a "queue" button. Preferably, a queued designation would also appear in the list of all players on the "players" page to indicate the players for which an alert has been set. Other information about the queued players may also appear on the "queue" page, as depicted in FIG. 7. The "queue" page depicted in FIG. 7 is strictly exemplary, and the present technology is not limited to any particular arrangements for the fantasy sports league "queue" page.

Figure 8B:
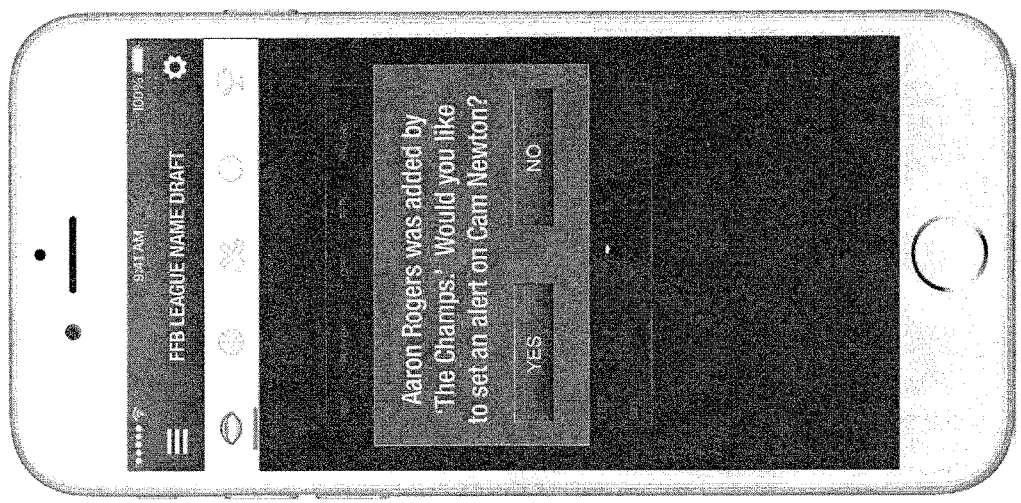
FIG. 8b is an image of an alert notification for a fantasy sports league employing the exemplary embodiments of the present technology depicted schematically in FIGS. 1 and 2.
Figure 8A:
FIG. 8a is an image of an alert notification for a fantasy sports league employing the exemplary embodiments of the present technology depicted schematically in FIGS. 1 and 2.

FIG. 8a depicts an alert notification received by a user's mobile device according to exemplary embodiments of the present technology. The alert notification depicted in FIG. 8a indicates that a player has entered the threshold radius of the user's geolocation. In preferable embodiments, the user receives an alert notification only for players he or she has flagged. However, other embodiments of the present technology may generate an alert notification any time a player enters the threshold radius of the user. The alert notification depicted in FIG. 8a merely indicates that a player has entered the user's vicinity, without any additional information. Some embodiments of the present technology generate an alert notification with additional information, such as the player's name, sport, team, position, the fantasy league the user has tagged the player for, etc. Preferable embodiments of the present technology allow a user to control the amount of information provided in the alert notifications, or may allow a league commissioner to control the amount of information the alert notifications provide to users in particular leagues. While FIG. 8a depicts one exemplary alert notification generated by some embodiments of the claimed system, the present technology is not limited to any particular embodiment of the alert notifications or the amount of information contained therein.

FIG. 8b also depicts an alert notification received by a user's mobile device according to exemplary embodiments of the present technology. The alert notification depicted in FIG. 8b indicates that a player has been "captured" by another user. This alert notification is preferably used in season long and dynasty leagues, where only one user in the league can own each player. In daily leagues, every user can own whatever players they want, so an alert similar to that depicted in FIG. 8b is less useful. While the exemplary alert notification depicted in FIG. 8b provides information about the particular player that was "captured" and suggests a replacement player to flag, in some embodiments, the alert notification might simply indicate that a player has been "captured" by another specific user or might simply indicate that a particularly identified player has been captured. Preferable embodiments may suggest a replacement player, for example at the same position as the "captured" player (in this case, both Aaron Rodgers and Cam Newton are quarterbacks). Preferable embodiments of the present technology may suggest a replacement player that is expected to perform similarly or favorably to the player "captured." Again, the amount of information provided in the alert notification may vary, and the users of the present technology can preferably control the amount of information that they receive. Furthermore, preferable embodiments of the technology generate an alert notification such as that depicted in FIG. 8b only when a player the user has flagged is "captured" by another user. The alert notification depicted in FIG. 8b is strictly exemplary, and the present technology is not limited to any particular embodiment of the alert notifications or the amount of information contained therein.

Figure 9:
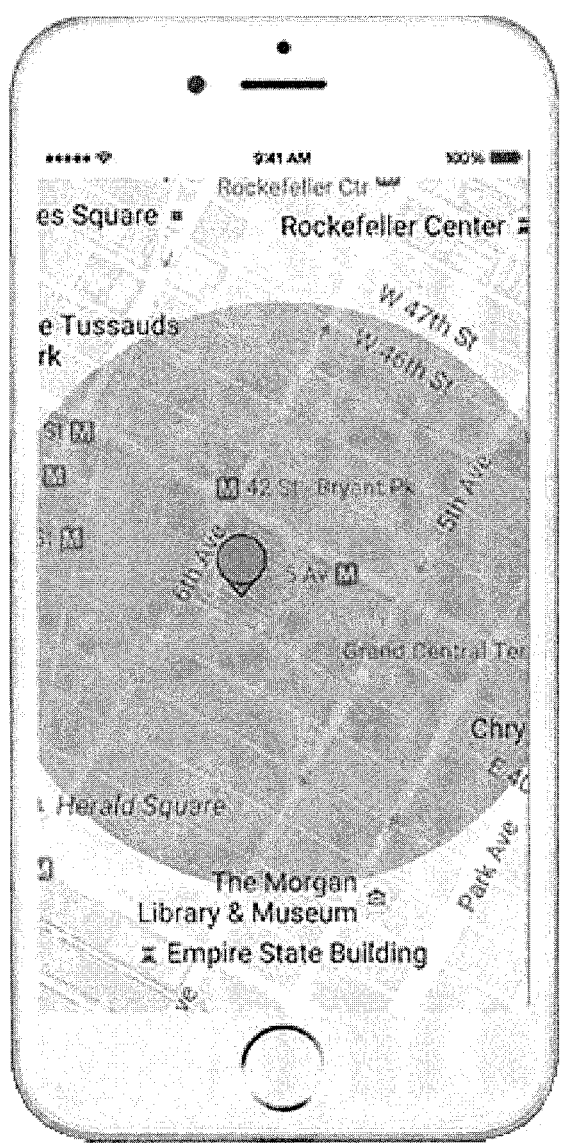
FIG. 9 is an image of a heat map for a fantasy sports league employing the exemplary embodiments of the present technology depicted schematically in FIGS. 1 and 2.

Some preferable embodiments of the present technology may launch a heat map, as depicted in FIG. 9, when the user opens the fantasy sports application after receiving an alert notification similar to that depicted in FIG. 8a. In the example depicted in FIG. 9, the heat map indicates a player, preferably the player for which the user received the alert notification similar to that depicted in FIG. 8a, is located close to the user's geolocation. In the example depicted in FIG. 9, only an indicator of the player's location is provided on the heat map, without any additional information. Alternative embodiments may provide additional information, such as the player's name, sport, team, position, etc. In addition, the heat map may indicate the locations of additional players, tokens, etc. The heat map may include indicators of both flagged and unflagged players nearby, for example using differently colored location tags. Those skilled in the art will recognize the variations and alternative embodiments possible for the heat map. Some of these alternative embodiments of the heat map are depicted in FIGS. 10a-10c.

Figure 10C:
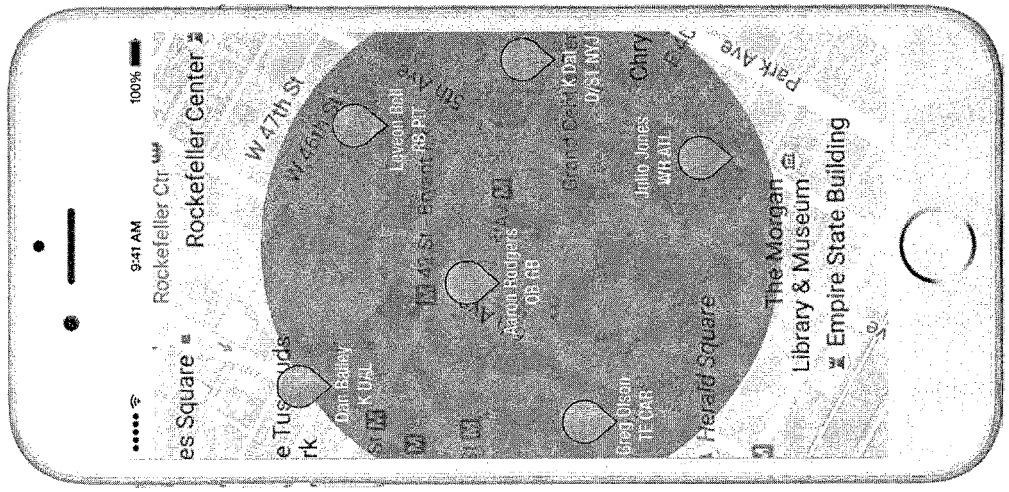
FIG. 10c is an image of a heat map for a fantasy sports league employing the exemplary embodiments of the present technology depicted schematically in FIGS. 1 and 2.
Figure 10B:
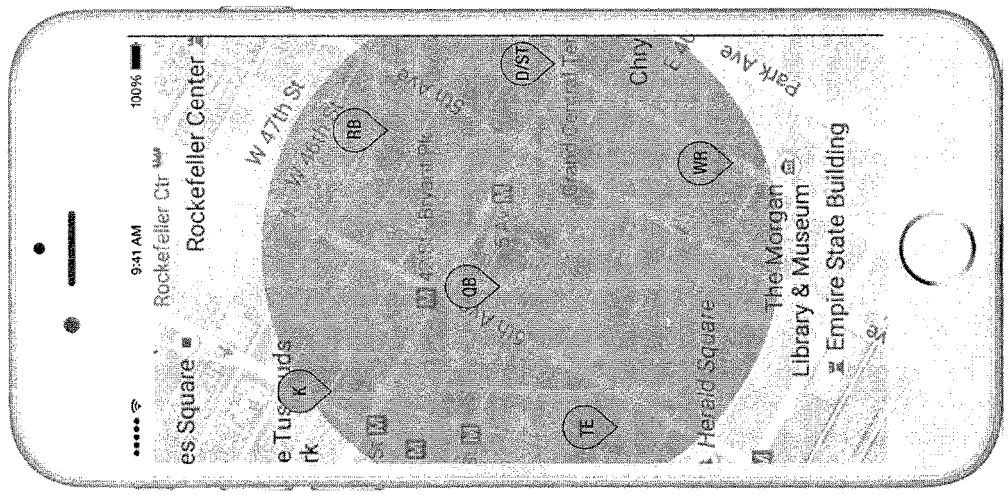
FIG. 10b is an image of a heat map for a fantasy sports league employing the exemplary embodiments of the present technology depicted schematically in FIGS. 1 and 2.
Figure 10A:
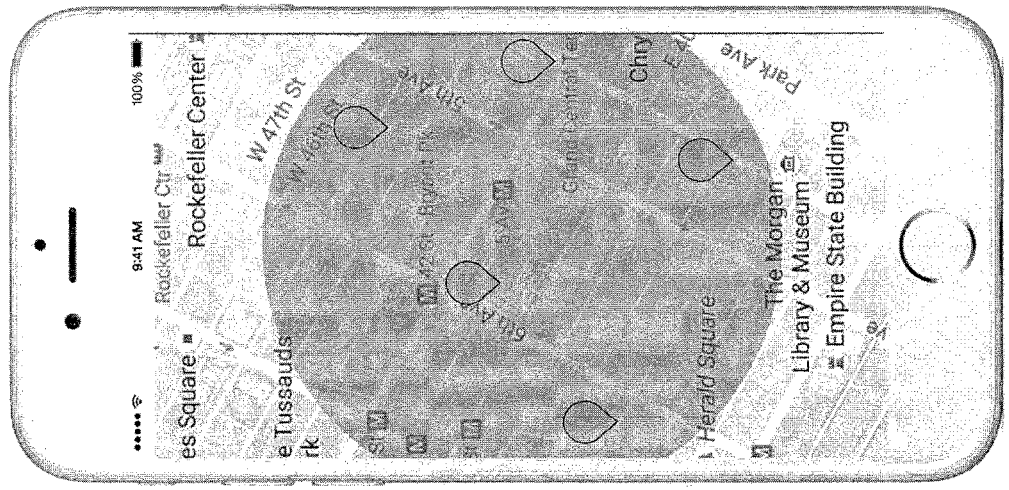
FIG. 10a is an image of a heat map for a fantasy sports league employing the exemplary embodiments of the present technology depicted schematically in FIGS. 1 and 2.

FIG. 10a depicts a heat map with several location tags indicating the locations of various players and/or tokens, for example promotion tokens, trade tokens, etc. The heat map depicted in FIG. 10a includes a minimal amount of information, merely indicating the location of players or tokens available for "capture." In some embodiments, one or more of the location tags might be colored differently to indicate, for example, a tagged player, an untagged player, a promotion token, etc.

FIG. 10b depicts a heat map, again with several location tags, but this time with more information. Specifically, in this example, the location tags indicate the position of the players located at those spots in the heat map, such as "K" for kicker or "QB" for quarterback. Such additional information might assist a user in "capturing" the player he or she wants more than the others if, for example, other users are in the same area or if time is limited. Again, preferable embodiments permit the users to control the amount of information provided on the heat map.

FIG. 10c depicts a heat map with even more information about the players located at the location tags. In this example, the user sees the player's name, team, and position. The heat maps depicted in FIGS. 9 and 10a-10c are strictly exemplary, and the present technology is not limited to any particular embodiment of the heat map or the amount of information contained therein.

Figure 11:
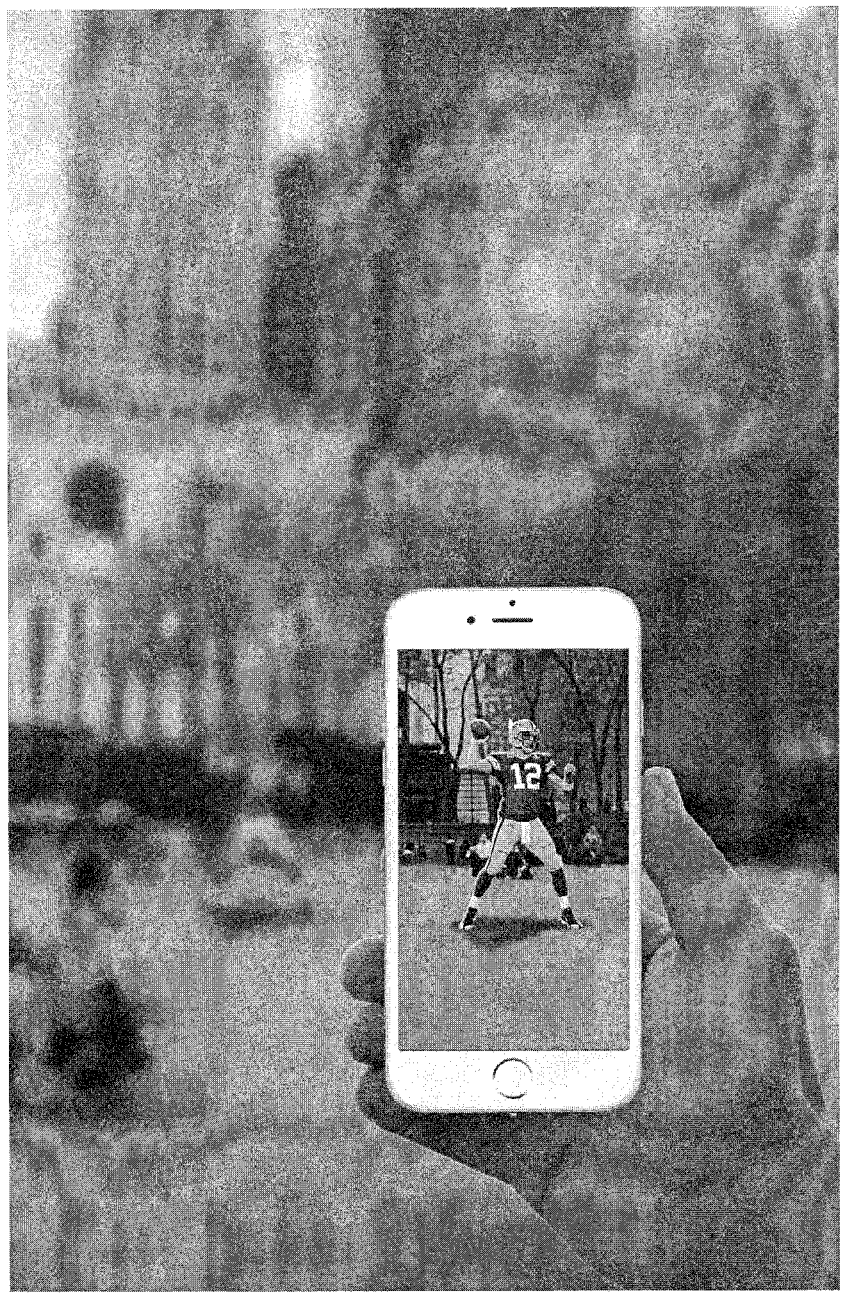
FIG. 11 is an image of an augmented reality depth map for a fantasy sports league employing the exemplary embodiments of the present technology depicted schematically in FIGS. 1 and 2.

Users of the preferable embodiments of the present technology employing a heat map can use the heat map to navigate to a targeted player's geolocation. Upon arriving at the desired player's geolocation, the user may open the augmented reality depth map, an example of which is depicted in FIG. 11. In this example, the user has located Aaron Rodgers, as seen through the augmented reality depth map on the user's mobile device. The user may "capture" Aaron Rodgers to add him to the user's fantasy football team by swiping the digital image, clicking on the digital image, simply arriving within the immediate physical proximity of the player's location, or using one of several other methods.

Figure 12:
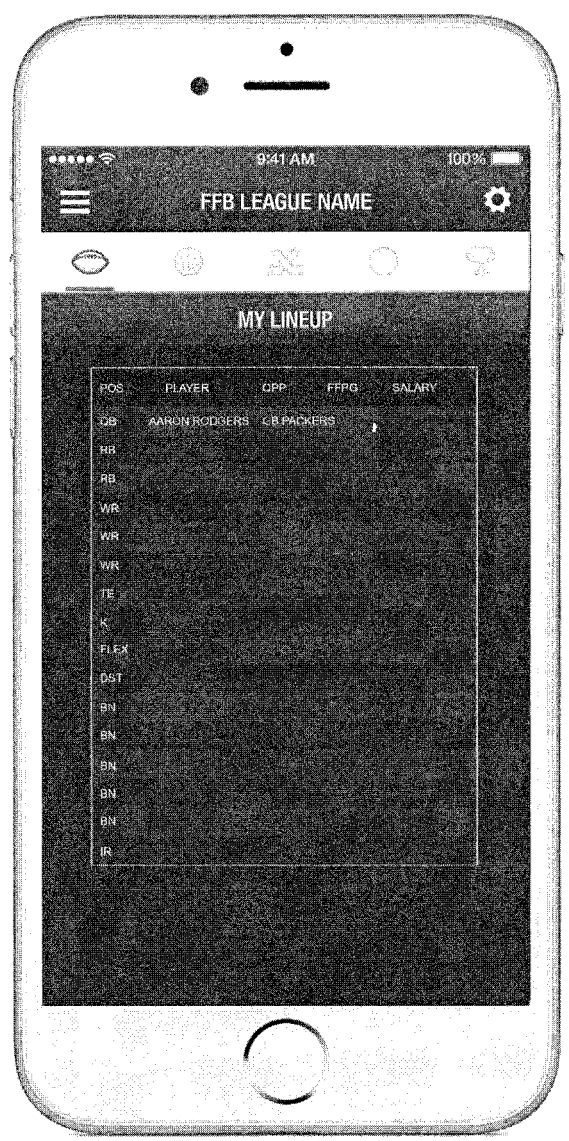
FIG. 12 is an image of a lineup page for a fantasy sports league employing the exemplary embodiments of the present technology depicted schematically in FIGS. 1 and 2.

Those of skill in the art will recognize the various ways by which a user can "capture" a digital image using an augmented reality depth map. Upon "capturing" the player's digital image, the player is preferably added to the user's lineup, as depicted in FIG. 12.

In the example depicted in FIG. 11, the player appears stationary performing an activity associated with the player's sport; in this case, throwing a football. However, many alternative digital images are possible and are included in the present technology. For example, the digital image might comprise a GIF of the player performing an activity. The activity might relate to the sport the player plays or might be a common activity performed by people generally, for example walking a dog. In some preferable embodiments of the technology, the activity the player is depicted performing might relate to the environment the player is found in. For example, a player located in a park might be depicted walking a dog, picnicking, or performing a sports related activity, such as throwing a Frisbee or football, regardless of the sport the player actually plays. A player located in a coffee shop or restaurant, for example, might be sitting at a table eating or drinking a coffee. Such preferable embodiments of the present technology would generate a digital image of the player performing an activity relating to the location in which they are found, thereby providing the user with a more life-like feel to "capturing" the player.

Other preferable embodiments might depict the player acting surprised or excited when being "captured" by the user. In some instances, the player might give the user a thumbs-up or head nod as if to indicate he or she is ready to take the field for the user's fantasy sports team. Those skilled in the art will recognize the many other variations of this interactive embodiment of the augmented reality depth map, all of which are included in the present technology. To generate a digital image of the player performing an activity relating to the particular location where the player is found, the augmented reality module would receive the user's geolocation information and determine the type of location the user is at, whether a park, building, etc. The augmented reality module would then generate a digital image of the particular player performing an activity one would expect at the user's particular location.

Figure 13:
FIG. 13 is an image of an augmented reality depth map for a fantasy sports league employing the exemplary embodiments of the present technology depicted schematically in FIGS. 1 and 2.

FIG. 13 depicts another image of an augmented reality depth map according to exemplary embodiments of the present technology. In this case, the user has navigated to a promotion token, specifically for Pepsi. The user may "capture" the promotion token using the same methods covered above for "capturing" players. Upon "capturing" enough promotion tokens, the user might receive promotional materials, such as discounts, free products or services, etc. Some embodiments of the technology employ tokens for other uses related to the fantasy sports game, such as making trades and/or acquiring additional players. Those skilled in the art will recognize the many possibilities for the token system using the present technology.

The promotion token depicted in FIG. 13 merely shows the brand's logo. Many other variations are also included in the present technology. For example, instead of a digital image of the Pepsi logo, the augmented reality depth map might depict a person drinking a Pepsi product. Or the promotion token might depict a specific promotion, such as offering a free 20 ounce Pepsi product at participating retail locations. In some preferable embodiments, "capturing" a player and a promotion token might be combined. For example, the augmented reality depth map might depict Aaron Rodgers drinking a Pepsi product. By "capturing" Aaron Rodgers, the user might additionally receive a promotion token for Pepsi. Such embodiments can combine player activities with the promotion tokens. For example, Aaron Rodgers digital image when located at a Starbucks might show Aaron Rodgers drinking a Starbucks coffee. "Capturing" Aaron Rodgers while at Starbucks drinking a coffee might earn the user a promotion token that can be exchanged for a free coffee at Starbucks. In this manner, companies can market their brands and products to the users of the fantasy sports application using the users' favorite sports players. Such embodiments of the present technology have applications outside the fantasy sports context as well.

The augmented reality depth map of the present technology has many possible variations and applications. FIGS. 11 and 13 depict just two examples of the possible augmented reality depth maps generated by the present technology, and the present technology is not limited to any particular embodiment of the augmented reality depth map specifically discussed.

Figure 14:
FIG. 14 is an image of a promotion bank page for a fantasy sports league employing the exemplary embodiments of the present technology depicted schematically in FIGS. 1 and 2.

FIG. 14 depicts an exemplary "promotion bank" page for a fantasy sports league implementing exemplary embodiments of the present technology. The "promotion bank" page would track the promotion tokens the user has collected through a typical fantasy sports application used by commonly trafficked hosts, and the present technology is intended to be compatible with such fantasy sports applications. As depicted in FIG. 14, the "promotion bank" page preferably lists the companies that offer promotional deals and tracks the number of promotion tokens the user has collected for each company, in some embodiments. There are many variations to the promotional aspect of the present technology as discussed above, including prize specific tokens, etc. Each of these variations could be tracked using a "promotion bank" page similar to that depicted in FIG. 14, which is strictly exemplary, and the present technology is not limited to any particular embodiment of the "promotion bank" page.

Figure 15:
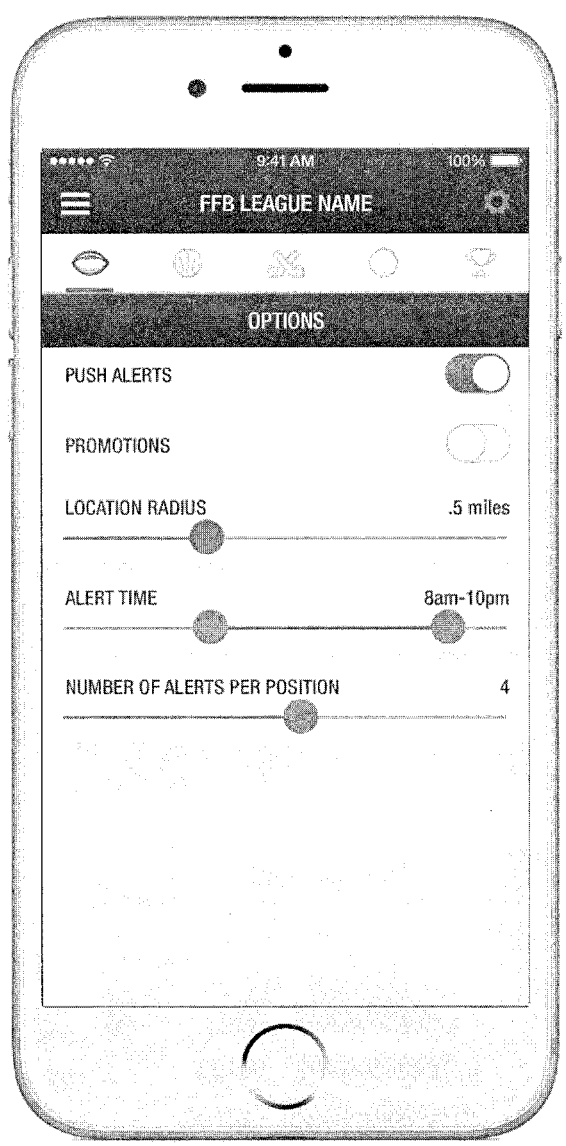
FIG. 15 is an image of an options page for a fantasy sports league employing the exemplary embodiments of the present technology depicted schematically in FIGS. 1 and 2.

FIG. 15 depicts an options page for a fantasy sports league employing exemplary embodiments of the present technology. The options page is preferably similar to the options or settings page typically used by commonly trafficked hosts of fantasy sports applications, and the options depicted in FIG. 15, as well as additional and/or different options, are preferably added to the list of options or settings provided to the users of typical fantasy sports applications. The options depicted in FIG. 15 are specific to fantasy sports applications employing the present technology, which is intended to be compatible with such fantasy sports applications. The options are preferably set by the user and preferably include the option to turn on or off alert notifications, turn on or off promotion tokens in the augmented reality depth map, set the threshold radius within which a player must be to generate an alert notification, set the time period during which the user wishes to receive alert notifications, and/or set the number of alert notifications the user wishes to receive, based upon, for example, time period, player position, etc., among other possible options. The options page depicted in FIG. 15 is strictly exemplary, and the present technology is not limited to any particular embodiment of the options page.

While the present technology has been described with reference to particular embodiments and arrangements of parts, features, and the like, the present technology is not limited to these embodiments or arrangements. Indeed, many modifications and variations will be ascertainable to those of skill in the art, all of which are inferentially included in these teachings.

What is claimed is:

1. A system for assembling a fantasy sports team using augmented reality, comprising:
   one or more mobile devices in electronic communication with a network, each mobile device comprising an imaging device;
   a user database storing information about one or more users of the system and one or more fantasy sports teams associated with the one or more users;
   a sports player database storing information about a plurality of real-world players of one or more sports;
   a fantasy game server that communicates with the one or more mobile devices via the network, the fantasy game server being operable to host an augmented fantasy sports game and comprising
      a user interface module that generates a user interface accessible by the one or more mobile devices, and
      an augmented reality module;
   wherein the augmented reality module receives environmental information about the one or more users' environment from the imaging device of the one or more mobile devices, generates a real-world depth map from the environmental information received from the imaging device of the one or more mobile devices, generates a virtual depth map depicting images of one or more real-world players of one or more sports from the sports player database, blends the real-world depth map with the virtual depth map to create an augmented depth map depicting the environmental information received from the imaging device of the one or more mobile devices and the images of one or more real-world players of one or more sports from the sports player database;
   wherein the one or more mobile devices receive the augmented depth map via the user interface; and
   wherein the user interface allows users of the one or more mobile devices to capture one or more images of the real-world players, adding the real-world player to one or more of the fantasy sports teams associated with the user and storing the updated information about the user's one or more fantasy sports teams in the user database.

2. The system of claim 1, wherein:
   the virtual depth map also depicts one or more images of promotion tokens; and
   the user interface allows users of the one or more mobile devices to capture the one or more images of promotion tokens, storing promotion bank information associated with the user in the user database.

3. The system of claim 1, wherein:
   the sports player database further stores an interest flag for each of the plurality of real-world players;
   the user interface allows the user to select or deselect the interest flag;
   the one or more mobile devices further comprise geolocation identification software that identifies the user's geolocation;
   the fantasy game server further comprises a player geolocation randomization module and an alert notification module;
   the player geolocation randomization module generates an algorithm for providing the plurality of real-world players with geolocation information; and
   the alert notification module generates an alert notification when a real-world player that the user has flagged enters a threshold radius of the user's geolocation and sends the alert notification to the user's mobile device over the network.

4. The system of claim 3, wherein the alert notification module generates an alert notification when a real-world player that the user has flagged is captured by another user.

5. The system of claim 3, wherein:
   the fantasy game server further comprises a mapping module, the mapping module generating a map depicting the user's geolocation and the geolocations of the real-world players that the user has flagged that are within the threshold radius of the user's geolocation; and
   the map depicting the geolocations is provided to the user's mobile device through the user interface.

6. The system of claim 5, wherein the map depicting the geolocations of the real-world players includes information about the real-world players from the sports player database, the information comprising one or more item from the following list: player's name, player's team, and player's position.

7. The system of claim 3, wherein:
   the user database further stores system settings information, the system settings information comprising one or more setting from the following list: alert notifications permitted flag, alert notification threshold radius, alert notification receipt time span, and alert notification number limit; and
   the user interface allows the user to update the system settings information.

8. The system of claim 2, wherein:
   the user database further stores a promotions flag;
   the user interface allows the user to select or deselect the promotions flag; and
   the augmented reality module generates a virtual map depicting the one or more images of promotion tokens only when the promotions flag associated with the user is selected.

9. A method for assembling a fantasy sports team using augmented reality, comprising the steps of:
   selecting one or more real-world players of one or more sports from a sports player database;
   generating an algorithm that randomizes geolocations of the plurality of real-world players in the sports player database;
   detecting a user's geolocation using geolocation identification software executing on a mobile device;
   generating an alert notification when a selected real-world player enters a threshold radius of the user's geolocation;
   sending the alert notification over a network to the user's mobile device;
   generating a real-world depth map from environmental information received from an imaging application of the mobile device;
   generating a virtual depth map comprising images of the one or more selected real-world players that are within the threshold radius of the user's geolocation;
   blending the real-world depth map with the virtual depth map to generate an augmented depth map depicting the environmental information received from the imaging application of the mobile device and the images of the one or more selected real-world players;
   providing the augmented depth map to the user's mobile device through a user interface;
   capturing the real-world players depicted on the augmented depth map through the user interface;

updating fantasy sports team information associated with the user and stored on a user database.

10. The method of claim 9, further comprising the steps of:
generating the virtual depth map further comprising images of one or more promotion tokens;
capturing the promotion tokens depicted on the augmented depth map through the user interface;
updating promotion bank information associated with the user and stored on the user database.

11. The method of claim 10, further comprising the steps of:
selecting a promotions flag;
updating the promotion flag stored in the user database; and
generating the virtual depth map further comprising images of one or more promotion tokens only when the user has selected the promotions flag.

12. The method of claim 9, further comprising the steps of:
generating a geographical map depicting the geolocation of the one or more selected real-world players relative to the user's mobile device;
providing the geographical map to the user's mobile device through the user interface.

13. The method of claim 12, wherein the geographical map depicting the geolocations of the real-world players includes information about the real-world players from the sports player database, the information comprising one or more item from the following list: player's name, player's team, and player's position.

14. The method of claim 9, further comprising the steps of:
generating an alert notification when a selected real-world player is captured by another user;
sending the alert notification over the network to the user's mobile device.

15. The method of claim 9, further comprising the steps of:
selecting system settings options, the system settings options comprising one or more options from the following list: alert notifications permitted flag, alert notification threshold radius, alert notification receipt time span, and alert notification number limit; and
updating system settings options associated with the user and stored on the user database.

16. A system for assembling a fantasy sports team using augmented reality, comprising:
one or more mobile devices connected to a network, each mobile device comprising an imaging device and geolocation identification software that identifies the user's geolocation;
a user database storing information about one or more users of the system and one or more fantasy sports teams associated with each user;
a sports player database storing information about a plurality of real-world players of one or more sports and an interest flag for each of the real-world players;
a fantasy game server connected to the network, the fantasy game server being operable to host an augmented fantasy sports game and comprising a user interface module that generates a user interface accessible by the one or more mobile devices, a player geolocation randomization module, an alert notification module, and an augmented reality module;
wherein the geolocation randomization module generates an algorithm for providing the real-world players with geolocation information and stores the geolocation information in the sports player database;
wherein the alert notification module generates an alert notification when a real-world player that the user has flagged enters a threshold radius of the user's geolocation and sends the alert notification to the user's mobile device over the network;
wherein the augmented reality module receives environmental information about the user's environment from the imaging device of the user's mobile device, generates a real-world depth map from the environmental information received from the imaging device, generates a virtual depth map depicting images of one or more real-world players from the sports player database and images of one or more promotion tokens, blends the real-world depth map with the virtual depth map to create an augmented depth map depicting the environmental information received from the imaging device and the images of the real-world players and the images of the promotion tokens;
wherein the one or more mobile devices receive the augmented depth map through the user interface; and
wherein the user interface allows users of the one or more mobile devices to capture one or more of the real-world players, adding the real-world player to one or more of the fantasy sports teams associated with the user and storing the updated information about the user's one or more fantasy sports teams in the user database, and to capture one or more of the promotion tokens, adding the promotion token to a promotion bank associated with the user and storing promotion bank information associated with the user in the user database.

17. The system of claim 16, wherein the alert notification module generates an alert notification when a real-world player that the user has flagged is captured by another user.

18. The system of claim 17, wherein the alert notification that another user has captured a real-world player that the user has flagged comprises information, generated by the alert notification module, about an available real-world player that the user might be interested in based upon information stored in the user database and the sports player database.

19. The system of claim 16, wherein:
the fantasy game server further comprises a mapping module, the mapping module generating a map depicting the user's geolocation and the geolocations of the real-world players that the user has flagged that are within the threshold radius of the user's geolocation; and
the map depicting the geolocations is provided to the user's mobile device through the user interface.

20. The system of claim 16, wherein the map depicting the geolocations of the real-world players includes information about the real-world players from the sports player database, the information comprising one or more item on the following list: player's name, player's team, and player's position.

* * * * *